No. 617,602. Patented Jan. 10, 1899.
O. PRICE.
BICYCLE BELL.
(Application filed Nov. 3, 1898.)
(No Model.)
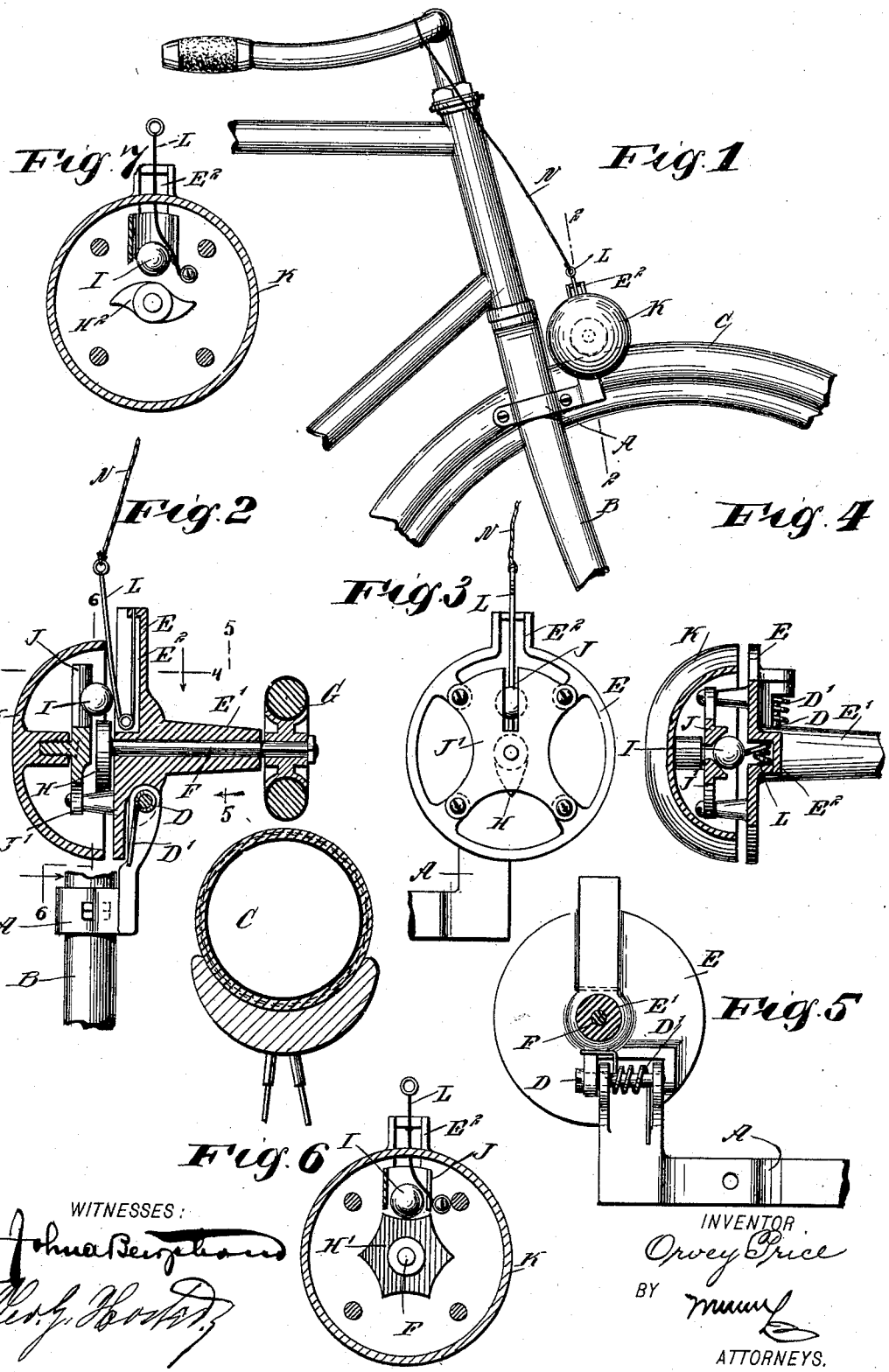
WITNESSES:
INVENTOR
Orvey Price
BY
ATTORNEYS.

UNITED STATES PATENT OFFICE.

ORVEY PRICE, OF FORTY FORT, PENNSYLVANIA.

BICYCLE-BELL.

SPECIFICATION forming part of Letters Patent No. 617,602, dated January 10, 1899.

Application filed November 3, 1898. Serial No. 695,355. (No model.)

*To all whom it may concern:*

Be it known that I, ORVEY PRICE, of Forty Fort, in the county of Luzerne and State of Pennsylvania, have invented a new and Improved Bicycle-Bell, of which the following is a full, clear, and exact description.

The object of the invention is to provide a new and improved bicycle-bell which is simple and durable in construction and arranged to permit a rider to throw the bell in gear with one of the bicycle-wheels to actuate and sound the gong.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the views.

Figure 1 is a side elevation of the improvement as applied. Fig. 2 is an enlarged transverse section of the same on the line 2 2 in Fig. 1. Fig. 3 is a face view of the same with the gong removed. Fig. 4 is a sectional plan view of the same on the line 4 4 in Fig. 2. Fig. 5 is a rear sectional elevation of the same on the line 5 5 in Fig. 2. Fig. 6 is a sectional elevation of the improvement on the line 6 6 in Fig. 2, showing a modified form of wiper; and Fig. 7 is a like view of the same, showing another modified form of wiper.

The improved bicycle-bell is provided with a clip A, adapted to be fastened to one of the arms of the front fork B of the bicycle in close proximity to the tire C of the steering-wheel, as is plainly indicated in Figs. 1 and 2. On the clip A is held a pivot D for a frame E to swing on, said frame being normally held in position by a spring D', coiled on the pivot D and resting with one end on the clip and with its other end on the frame E, as is plainly indicated in Fig. 5. The frame E is preferably in the form of a disk having a hub E' extending laterally from the back of the disk, and in said hub is mounted to turn a shaft F, carrying at its rear end a pulley G, adapted to be thrown in frictional contact with the tire C of the steering-wheel, so that the rotary motion of the latter is transmitted to said pulley and to the shaft F. Normally, however, the pulley G stands out of contact with the tire C, owing to the action of the spring D'.

On the forward end of the shaft F, in front of the frame E, is secured a wiper H, which may have one arm, as shown in Figs. 2 and 3, or two arms, as shown at $H^2$, (see Fig. 7,) or still more arms or wings, as illustrated at H' in Fig. 6. This wiper H is adapted to engage a clapper I, preferably in the form of a ball and mounted loosely in a guideway J, extending vertically on a plate J', supported from the frame E within a gong K, secured on a post carried by said plate J'. (See Fig. 2.) When the shaft F is rotated, as previously described, the wings or arms of the wiper H, which revolves with the shaft, come in contact with the clapper I to throw the same outward in the guideway J, so that the ball strikes the inside of the gong K and sounds the same, and then said ball immediately drops by its own weight back upon the wiper, to be thrown outward by the next arm or wing of the wiper.

In order to hold the clapper I in a locked position at or near the outer end of the guideway J to prevent rattling while the bell is not in use, I provide a spring L, secured on the frame E and extending within a recess $E^2$, located opposite the guideway J. The outer end of the spring L is connected with a rope N, extending up to the handle-bar of the bicycle, so as to be within convenient reach of the operator.

When it is desired to use the device, the operator pulls on the rope N and in doing so closes the spring and releases the clapper I, which drops back into an innermost position—that is, in contact with the striker—to be actuated by the same, as previously described, and at the same time the pull on the spring L causes a swinging of the frame E and all the parts carried thereby to move the pulley G into frictional contact with the tire C of the steering-wheel, so that said pulley G, shaft F, and wiper H are rotated. The wiper now throws the ball in succession outward against the gong K to repeatedly sound the same. As soon as the operator releases the cord N the spring L returns to its normal position, thus releasing the frame E, which now immediately swings back to its normal position by the action of the spring D'. As the pulley G moves out of contact with the tire C further rotation of the pulley ceases; but the clapper I after the release of the spring L is caught by the spring at the outer end of the guideway and held securely in this position until the spring L is again closed by the operator pulling on the rope or cord N.

Having thus fully described my invention, I claim as new and desire to secure by Letters Patent—

1. A bicycle-bell provided with a revoluble wiper, and a loose clapper adapted to pass into the path of the wiper, and be thrown outward by the same into contact with the gong, to sound the gong, substantially as shown and described.

2. A bicycle-bell provided with a revoluble wiper, a loose clapper adapted to pass into the path of the wiper and be thrown outward by the same into contact with the gong to sound the gong, and a fixed guideway in which the clapper is free to travel when thrown outward by the wiper against the gong, to then return by its own weight, substantially as shown and described.

3. A bicycle-bell provided with a revoluble wiper, a loose clapper adapted to pass into the path of the wiper and be thrown outward by the same into contact with the gong to sound the gong, a fixed guideway in which the clapper is free to travel when thrown outward by the wiper against the gong, to then return by its own weight, and a spring for locking the clapper in the guideway, out of the path of the wiper, substantially as shown and described.

4. A bicycle-bell provided with a frame, a shaft journaled in the frame and carrying a pulley adapted to be moved in frictional contact with the bicycle-tire, a wiper on said shaft, a gong carried by the frame, a clapper mounted loosely in a guideway carried by the frame and adapted to move in contact with the gong, and a spring under the control of the operator, and connected with said frame to impart a swinging motion to the latter, to bring the pulley in frictional contact with the tire, said spring also serving to lock the clapper in position in the guideway when the device is not in use, substantially as shown and described.

ORVEY PRICE.

Witnesses:
MARCUS SMITH, Jr.,
JAMES COOL.